United States Patent
Kawaguchi et al.

(10) Patent No.: US 7,808,881 B2
(45) Date of Patent: Oct. 5, 2010

(54) OPTICAL RECORDING MEDIUM, OPTICAL RECORDING MEDIUM MANUFACTURING METHOD, AND OPTICAL RECORDING MEDIUM REPRODUCING METHOD

(75) Inventors: Yuko Kawaguchi, Ibaraki (JP); Shinya Abe, Kadamo (JP); Morio Tomiyama, Ikoma (JP); Eiji Ohno, Hirakata (JP)

(73) Assignee: Panasonic Corporation, Osaka (JP)

( * ) Notice: Subject to any disclaimer, the term of this patent is extended or adjusted under 35 U.S.C. 154(b) by 794 days.

(21) Appl. No.: 10/509,745

(22) PCT Filed: Mar. 16, 2004

(86) PCT No.: PCT/JP2004/003459

§ 371 (c)(1),
(2), (4) Date: Sep. 30, 2004

(87) PCT Pub. No.: WO2004/093066

PCT Pub. Date: Oct. 28, 2004

(65) Prior Publication Data

US 2005/0201260 A1 Sep. 15, 2005

(30) Foreign Application Priority Data

Apr. 14, 2003 (JP) ............................. 2003-108549

(51) Int. Cl.
*G11B 7/24* (2006.01)
(52) U.S. Cl. .................................................. 369/275.1
(58) Field of Classification Search ................ 428/64.9, 428/66.6
See application file for complete search history.

(56) References Cited

U.S. PATENT DOCUMENTS

| | | | | |
|---|---|---|---|---|
| 5,013,594 A | * | 5/1991 | Mizumura et al. | 428/64.7 |
| 5,016,240 A | * | 5/1991 | Strandjord et al. | 369/288 |
| 5,021,276 A | * | 6/1991 | Kamezaki et al. | 428/64.9 |
| 5,317,553 A | | 5/1994 | Ohga et al. | |

(Continued)

FOREIGN PATENT DOCUMENTS

EP 1 102 263 11/2000

(Continued)

OTHER PUBLICATIONS

Office Action issued Aug. 5, 2009 in corresponding Canadian Application No. 2,477,869.

*Primary Examiner*—Daniell L Negrón
*Assistant Examiner*—Henok G Heyi
(74) *Attorney, Agent, or Firm*—Wenderoth, Lind & Ponack, L.L.P.

(57) ABSTRACT

An optical recording medium includes a main-information area in which a metal reflection film is formed on a substrate where a row of pits is formed as main data, and a sub-information area in which is recorded medium identification information, which is used to identify the optical recording medium individually, by removing the metal reflection film partially and forming a plurality of reflection-film removed areas. Information is reproduced by irradiating the metal reflection film with a beam of light. In the sub-information area, a row of pits or a guide groove is formed on the substrate, and a track pitch of the row of pits or the guide groove is at least 0.24 μm wide and at most 0.45 μm wide.

3 Claims, 7 Drawing Sheets

U.S. PATENT DOCUMENTS

| | | | |
|---|---|---|---|
| 5,476,700 A * | 12/1995 | Asai et al. | 428/66.6 |
| 6,175,548 B1 | 1/2001 | Kashiwagi | |
| 6,524,766 B1 | 2/2003 | Ariyoshi et al. | |
| 6,808,778 B2 * | 10/2004 | Arioka et al. | 428/64.1 |
| 7,142,496 B2 * | 11/2006 | Miyagawa et al. | 369/59.11 |
| 7,408,870 B2 * | 8/2008 | Lee | 369/275.3 |
| 2001/0015949 A1 * | 8/2001 | Nagase et al. | 369/100 |
| 2001/0044000 A1 * | 11/2001 | Miki | 428/64.2 |
| 2002/0015378 A1 * | 2/2002 | Komaki et al. | 369/275.1 |
| 2002/0018439 A1 * | 2/2002 | Kato et al. | 369/275.4 |
| 2003/0137924 A1 * | 7/2003 | Aratani et al. | 369/288 |
| 2004/0022987 A1 * | 2/2004 | Ashida et al. | 428/64.4 |
| 2004/0228251 A1 * | 11/2004 | Lee | 369/59.13 |
| 2004/0264323 A1 * | 12/2004 | Worthington et al. | 369/47.27 |
| 2005/0074701 A1 * | 4/2005 | Tsukuda et al. | 430/320 |
| 2006/0031868 A1 * | 2/2006 | Yamaoka et al. | 720/718 |

FOREIGN PATENT DOCUMENTS

| | | | |
|---|---|---|---|
| EP | 1 152 402 | | 11/2001 |
| EP | 1 271 490 | | 1/2003 |
| JP | 10-188361 | | 7/1998 |
| JP | 10-233019 | | 9/1998 |
| JP | 2000-011453 | * | 1/2000 |
| JP | 2000-11453 | | 1/2000 |
| JP | 2000-57632 | | 2/2000 |
| JP | 2001-216686 | * | 8/2001 |
| JP | 2001-229542 | * | 8/2001 |
| JP | 2001229542 A | * | 8/2001 |
| RU | 2 107 954 | | 3/1998 |
| WO | 96/16401 | | 5/1996 |
| WO | 02/37483 | | 5/2002 |

* cited by examiner

OPTICAL RECORDING MEDIUM, OPTICAL RECORDING MEDIUM MANUFACTURING METHOD, AND OPTICAL RECORDING MEDIUM REPRODUCING METHOD

TECHNICAL FIELD

The present invention relates to an optical recording medium, particularly, an optical disk which is shaped like a circular plate and is used to reproduce information.

BACKGROUND ART

As a conventional optical recording medium, for example, there is an optical disk, such as a CD-ROM and a DVD-ROM. In such an optical disk, an uneven row of pits is formed on a transparent substrate which is made of polycarbonate or the like. On the substrate, a metal reflection film is formed which is made of Al or the like. From a side of a surface opposite to a surface on which this metal reflection film is formed, a beam of light is applied to the metal reflection film which is an information recording surface. Thereby, information is reproduced.

Such an optical recording medium has been widely used in which information is recorded and reproduced by applying a beam of light. Thus, expectations have become greater of heightening its recording density from now on. In recent years, a variety of optical disks has been developed which can reproduce large-capacity audio-visual data or digital data. For example, research and development for a high-density ROM optical disk is now going on, in which a density of an optical disk which has a diameter of 12 centimeters is expected to become higher to a storage capacity of 23.3 to 30 gigabits.

On the other hand, a DVD ROM recording medium is provided with a security technique, specifically, a technique of preventing someone from illicitly using and copying recorded information or from doing such an act. As that security technique, a BCA (or burst cutting area) area is provided where medium identification information, which is used to identify each recording medium individually, is overwritten in a bar-code pattern. In this BCA area, when an optical recording medium is manufactured, medium identification information which differs for each optical recording medium is recorded, and if necessary, a key of cryptograph or a key of decoding is recorded.

For example, Japanese Patent Laid-Open No. 10-233019 specification discloses that a metal reflection film of an optical disk on which a row of pits is formed as main data is partially removed by laser trimming, and modulated data is recorded individually. Thus, medium identification information is recorded which is used to protect against illicitly using and copying, or such an act.

However, in order to heighten the above described density, a pitch between tracks has to be narrowed, or a shortest pit of a row of pits needs to be shortened. Besides, with respect to a high-density optical disk, at least 23.3 GB data is recorded on a 12 cm-diameter optical disk. Therefore, it has been determined that if on a substrate used for such an optical disk, a metal reflection film is formed which is made of an Al alloy material having a film thickness of 50 to 70 nm so that it can be used in a DVD ROM optical disk, that deteriorates quality of a reproduced signal.

This is because a metal reflection film seems to be difficult to form at a bottom of a minute pit about 0.2 µm long. Thus, the shorter a pit becomes, the deeper and the smaller it tends to be. Accordingly, as a metal reflection film for the above described high-density ROM optical disk, a metal reflection film which is used in a DVD ROM optical disk could not be used as it is.

In addition, when a DVD ROM optical disk is manufactured, medium identification information is recorded, using a medium-identification-information recording apparatus which is provided with a YAG (yttrium aluminum garnet) laser. However, even if the medium identification information is recorded in a bar-code pattern using this medium-identification-information recording apparatus, on an area where pits are not formed in a high-density ROM optical disk or on a row of pits which is recorded at a track pitch of 0.74 µm, which is the same as in the DVD ROM optical disk, then a pattern could not be formed. Or, reproduction noise of the medium identification information became louder, and thereby, an adequate defocus margin could not be secured.

This is because in a high-density ROM optical disk, a metal reflection film is thinner than that of a DVD ROM optical disk. Or, material of a metal reflection film in use is different, and thus, heat capacity necessary until the metal reflection film reaches its melting point is largely different. Accordingly, a conventional medium-identification-information recording apparatus provided with a YAG could not be used as it is when a high-density ROM optical disk is manufactured.

SUMMARY OF THE INVENTION

It is an object of the present invention to provide an optical recording medium in which data can be recorded more densely than in a DVD ROM optical disk, and by using a conventional medium-identification-information recording apparatus, medium identification information can be recorded so that an adequate defocus margin can be secured.

An optical recording medium according to an aspect of the present invention includes: a main-information area in which a metal reflection film is formed on a substrate where a row of pits is formed as main data; and a sub-information area in which is recorded medium identification information, which is used to identify the optical recording medium individually, by removing the metal reflection film partially and forming a plurality of reflection-film removed areas. Information is reproduced by irradiating the metal reflection film with a beam of light, and in the sub-information area, a row of pits or a guide groove is formed on the substrate, and a track pitch of the row of pits or the guide groove is at least 0.24 µm wide and at most 0.45 µm wide.

In this optical recording medium, a row of pits or a guide groove is formed in the sub-information area on the substrate, and the track pitch of the row of pits or the guide groove is set to be at least 0.24 µm wide and at most 0.45 µm wide. Therefore, by using a beam of light for reproduction having a shorter wavelength and an optical system having a higher numerical aperture, data can be recorded at a higher density than in a DVD ROM optical disk. In addition, even though thermal conductivity or a melting point, which is an intrinsic value of the metal reflection film is different, by using a conventional medium-identification-information recording apparatus, medium identification information can be recorded so that an adequate defocus margin can be secured.

A manufacturing method for an optical recording medium according to another aspect of the present invention, includes: a first step of preparing a substrate on which a row of pits is formed as main data in a main-information area, and a row of pits or a guide groove whose track pitch is at least 0.24 µm wide and at most 0.45 µm wide is formed in a sub-information area; a second step of forming a metal reflection film on the substrate; a third step of forming a resin layer on the metal reflection film; and a fourth step of recording medium identification information which is used to identify the optical recording medium individually by partially removing the metal reflection film in the sub-information area and forming a plurality of reflection-film removed areas.

By this manufacturing method for an optical recording medium, the row of pits or the guide groove is formed in the sub-information area on the substrate, and the track pitch of the row of pits or the guide groove is set to be at least 0.24 µm wide and at most 0.45 µm wide. Therefore, by using a beam of light for reproduction having a shorter wavelength and an optical system having a higher numerical aperture, data can be recorded at a higher density than in a DVD ROM optical disk. In addition, even though the thermal conductivity or melting point, which is the intrinsic value of the metal reflection film, is different, by using a conventional medium-identification-information recording apparatus, medium identification information can be recorded so that an adequate defocus margin can be secured.

A reproducing method for an optical recording medium according to still another aspect of the present invention, in which the optical recording medium includes a main-information area in which a metal reflection film is formed on a substrate where a row of pits is formed as main data, and a sub-information area in which a row of pits or a guide groove whose track pitch is at least 0.24 µm wide and at most 0.45 µm wide is formed on the substrate, includes medium identification information being recorded which is used to identify the optical recording medium individually by removing the metal reflection film partially and forming a plurality of reflection-film removed areas, and information is reproduced by irradiating the metal reflection film of the optical recording medium with a beam of light.

By this reproducing method for an optical recording medium, information is reproduced by applying a beam of light to the metal reflection film of the optical recording medium which includes a sub-information area where the row of pits or the guide groove is formed in the sub-information area on the substrate and the track pitch of the row of pits or the guide groove is set to be at least 0.24 µm wide and at most 0.45 µm wide. Therefore, by using a beam of light for reproduction having a shorter wavelength and an optical system having a higher numerical aperture, a good-quality signal can be obtained by reproducing data which has been recorded at a higher density than in a DVD ROM optical disk. In addition, even though the thermal conductivity or melting point, which is the intrinsic value of the metal reflection film, is different, by using a conventional medium-identification-information recording apparatus, the medium identification information which has been recorded at an adequate defocus margin can be steadily reproduced.

DETAILED DESCRIPTION OF THE PREFERRED EMBODIMENTS

Figure 1:
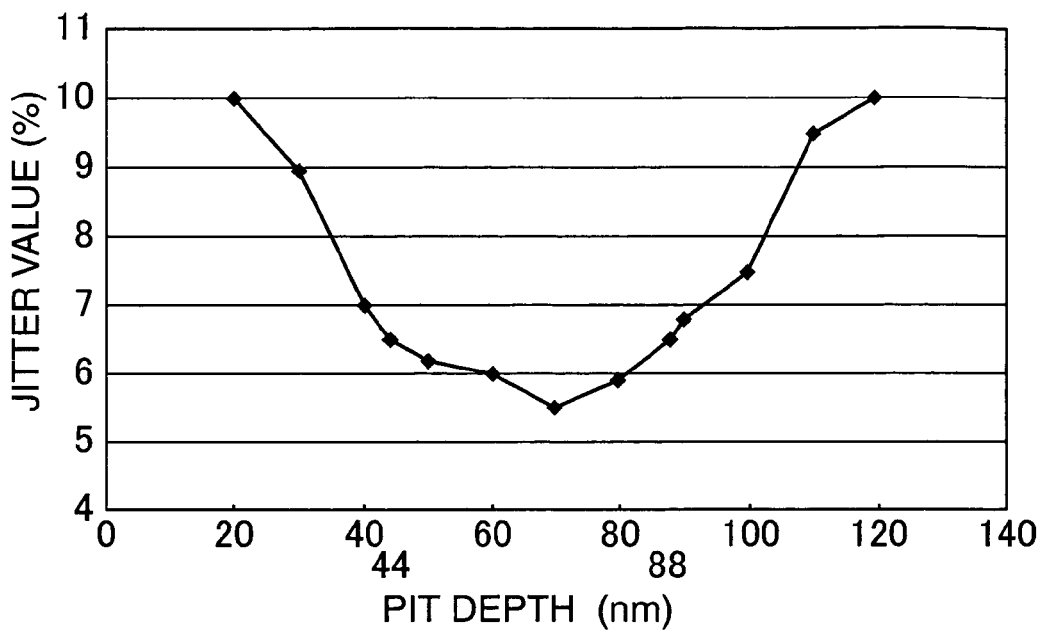
FIG. 1 is a graphical representation, showing a measurement result of a jitter value which corresponds to a depth of a pit.

Hereinafter, a ROM optical disk will be described as an example of an optical disk according to an embodiment of the present invention. Herein, an optical recording medium which is applied according to the present invention is not limited especially to this example. The present invention can also be applied to various optical recording mediums whose information recording layer has, for example, a minute unevenness, such as an optical magnetic disk and a phase-change disk.

The ROM optical disk includes: a main-information area in which a metal reflection film is formed on a substrate where an uneven row of pits is formed as main data; and a sub-information area in which medium identification information is recorded, which is used to identify the optical disk individually, by removing the metal reflection film partially and forming a plurality of reflection-film removed areas. In this optical disk, information is reproduced by irradiating the metal reflection film with a beam of light.

Generally, in order to heighten density of a ROM optical disk, a pitch between tracks has to be narrowed, and a shortest pit length (or a shortest mark length) needs to be extremely shortened. However, if a track pitch becomes too narrow, cross talk becomes greater in an RF-signal characteristic. This hinders securing an adequate system margin. If the shortest pit length becomes too short, then resolution of a reproduced signal lowers, thereby worsening a jitter value of a reproduced signal.

Therefore, an examination is repeatedly made of a most suitable track pitch, using an information reproducing apparatus in which a wavelength $\lambda$ of a light source of a beam of light for reproduction is 405 nm and a numerical aperture NA of an objective lens is 0.85. As a result of such an examination, the following measurement result is obtained. This presents the fact that if a track pitch is at least 0.24 μm wide, a crosstalk signal can be practically neglected, compared with a main signal.

| Track Pitch (μm) | Jitter Value (%) |
|---|---|
| 0.20 | 7.6 |
| 0.22 | 7.0 |
| 0.24 | 6.5 |
| 0.26 | 5.6 |
| 0.28 | 5.4 |

In addition, a most suitable shortest pit length is examined, using the above described information reproducing apparatus. As a result of a study of a resolution necessary for obtaining a desirable reproduction signal, a measurement result is obtained as follows. It has turned out that if a length of the shortest pit is at least 0.12 μm long, resolution of a reproduced signal can be adequately secured.

| Shortest-Pit Length (μm) | Jitter Value (%) |
|---|---|
| 0.10 | 8.2 |
| 0.11 | 6.8 |
| 0.12 | 6.5 |
| 0.13 | 5.4 |
| 0.14 | 5.3 |

Herein, in consideration of various margins of an optical disk or a drive, a jitter value which shows characteristics of an optical disk needs to be at most 6.5%.

Herein, information on a 12 cm-diameter optical disk is reproduced, using the information reproducing apparatus. In order to set a storage capacity of the optical disk to at least 23.3 GB, a relational expression (shortest pit length)×(track pitch)$\leq 0.0512$ μm$^2$ has to be satisfied. For example, if the recording capacity is 23.3 GB and the shortest pit length is 0.12 μm, an upper limit of the track pitch is about 0.43 μm. In the same way, if the recording capacity is 23.3 GB and the shortest pit length is 0.24 μm, an upper limit of the track pitch is about 0.21 μm.

Next, a manufacturing method will be described for a 12 cm-diameter optical disk which has a recording capacity of at least 23.3 GB. As described above, in order to create a 12 cm-diameter optical disk which has a recording capacity of at least 23.3 GB, a substrate has to be used whose track pitch is at least 0.24 μm wide and at most 0.43 μm wide, and its shortest pit length is at least 0.12 μm long and at most 0.21 μm long.

For example, in order to create a 12 cm-diameter optical disk which has a recording capacity of 25 GB, first, a substrate is prepared where a row of pits is formed which has a shortest pit length of 0.149 μm and a track pitch of 0.32 μm. As this substrate, for example, a substrate made of polycarbonate can be used which is created by an injection molding machine.

Next, a metal reflection film is formed on this substrate, using a film formation apparatus. As the film formation apparatus, one which can form a metal reflection film uniformly, such as a magnetron sputtering apparatus and a vapor depositing apparatus, can be used. For example, using a magnetron sputtering apparatus, a time for film formation can be varied, thereby controlling a film thickness of the metal reflection film. Herein, the material, film thickness, or the like, of the metal reflection film will be described later.

Next, the optical disk is placed on a spin coater, with the metal reflection film facing upwardly. Then, a resin to be hardened by ultraviolet rays is dripped, and on top of the resin, an 88 μm-thick transparent sheet which is made of polycarbonate is placed. In this state, the resin is irradiated with ultraviolet rays while the optical disk is being rotated by the spin coater. At this time, a rotational speed of the spin coater is controlled, so that a thickness of the resin after it has hardened becomes 12 μm. As a result, a transparent resin layer which has a film thickness of 100 μm is formed on the metal reflection film. For example, an acrylic resin can be used as this resin.

In such a way as described above, the metal reflection film was formed on the substrate where a row of pits was formed which had a shortest pit length of 0.149 μm and a track pitch of 0.32 μm. On top of it, a resin layer which had a film thickness of 100 μm is formed, and consequently, an optical disk is manufactured.

Next, with respect to the optical disk which was manufactured as described above, a study was made of a depth of a pit which corresponds to quality of a reproduced signal, material and film thickness of the metal reflection film, and the like. Specifically, the manufactured optical disk was set in the above described information reproducing apparatus. Then, this information reproducing apparatus allowed a beam of light to be incident upon the metal reflection film through the 100 μm-thick resin layer. Thereby, a reproduced signal was obtained from the optical disk, and then, this signal was assessed.

First, an examination was made as to how much quality of a reproduced signal depended upon depth of a pit. In the optical disk which was manufactured as described above, jitter values were measured which showed dispersion of reproduced signals when the depth of a pit varied. FIG. 1 is a graphical representation, showing a measurement result of the value of a jitter which corresponds to the depth of a pit. Its horizontal axis is the depth (nm) of a pit and the vertical axis is the value (%) of a jitter. In FIG. 1, as the metal reflection film, one was used which was made of an Al alloy with a purity of 99 wt % and had a film thickness of 25 nm. However, even when one was used which was made of an Ag98Pd1Cu1 (wt %) (hereinafter, referred to as the AgPdCu alloy), the same result as the following was obtained.

Generally, in order to secure an adequate system margin, the value of a jitter has to be at most 6.5%. In FIG. 1, it could be seen that if the depth of a pit is set to at least 44 nm and at most 88 nm, the value of a jitter would be at most 6.5%. Herein, a refractive index n of the created resin layer was 1.53, and a wavelength λ of the beam of light was 405 nm. Therefore, taking the above described measurement result into account, one can see that a depth D of a pit at which a desirable reproduction signal would be obtained is at least λ/(6×n), and at most λ/(3×n).

This seems to be for the following reason. Specifically, the depth of a pit affects amplitude of a reproduced signal, and in an optical calculation, when the depth of a pit is λ/(4×n), the amplitude becomes maximum. If a refractive index n of the resin layer is 1.53 and the wavelength λ of the beam of light is 405 nm, the amplitude becomes maximum when the pit depth is about 66 nm. But, even if the amplitude becomes a little smaller, the jitter value of a reproduced signal is almost unchanged. However, if the pit depth is below λ/(6×n), or if the pit depth is above λ/(3×n), then an adequate signal-tonoise ratio (hereinafter, referred to as an S/N ratio) cannot be obtained, thereby worsening the jitter value of a reproduced signal.

Figure 2:
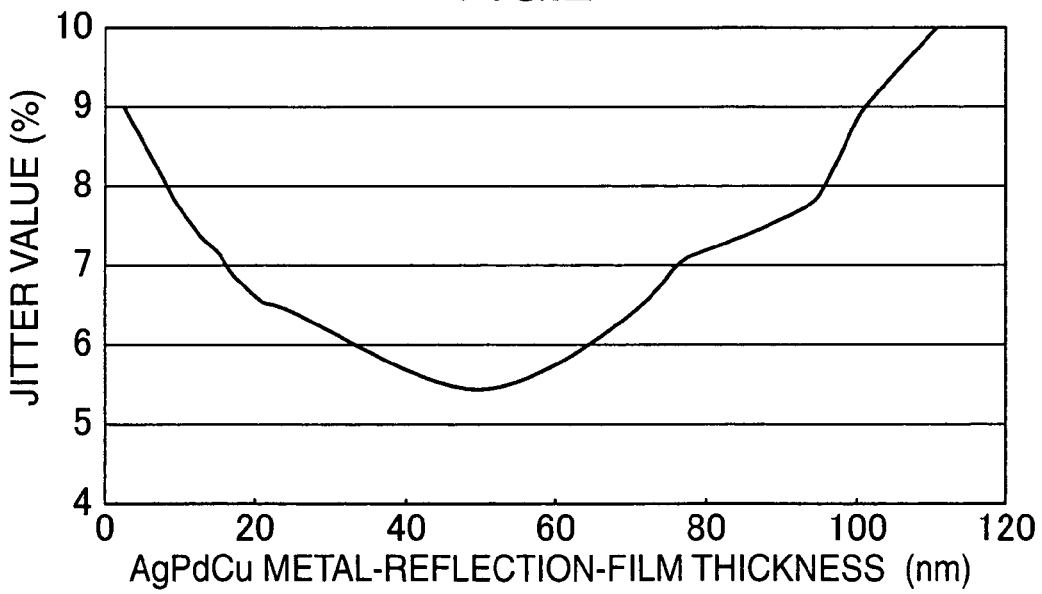
FIG. 2 is a graphical representation, showing a measurement result of a jitter value which corresponds to film thickness of a metal reflection film which is made of an AgPdCu alloy.
Figure 3:
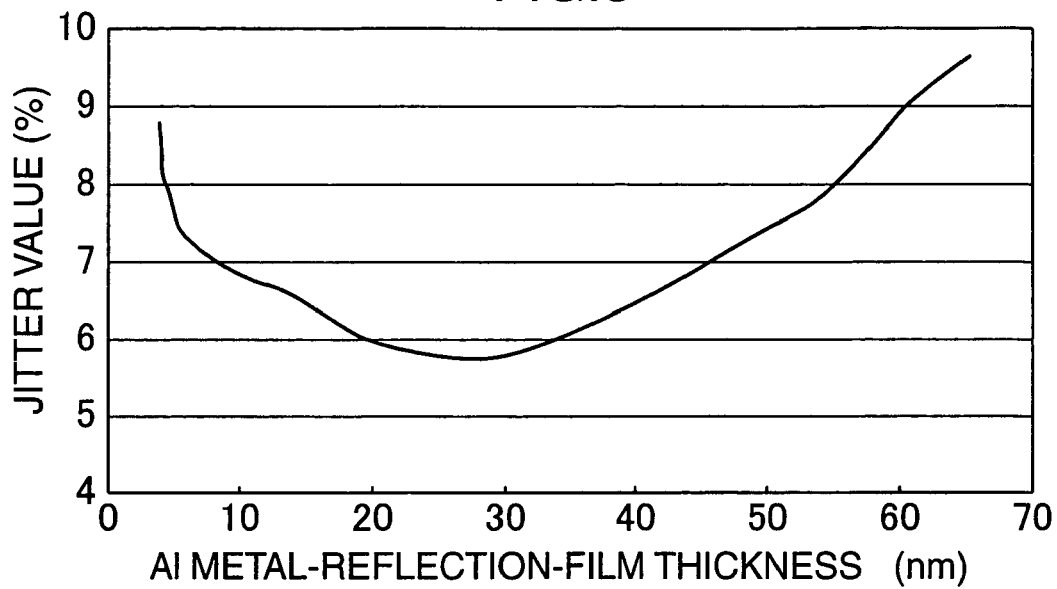
FIG. 3 is a graphical representation, showing a measurement result of a jitter value which corresponds to film thickness of a metal reflection film which is made of an Al alloy.

Next, a study was made of a suitable film thickness of a metal reflection film. First, a substrate was prepared in which the depth of a pit is $\lambda/(4\times n)$. As the metal reflection film, two kinds were used which were a metal reflection film which was made of an AgPdCu alloy and a metal reflection film which was made of an Al alloy with a purity of 99 wt %. Then, value of a jitter was measured when their film thickness was varied. FIG. 2 is a graphical representation, showing a measurement result of a jitter value which corresponds to a film thickness of the metal reflection film which is made of the AgPdCu alloy. FIG. 3 is a graphical representation, showing a measurement result of a jitter value which corresponds to a film thickness of the metal reflection film which is made of the Al alloy. In each figure, the horizontal axis is the film thickness (nm) of the metal reflection film, and the vertical axis is the value (%) of a jitter.

As can be seen in FIG. 2, in a case of the metal reflection film of the AgPdCu alloy, if its film thickness was at least 25 nm and at most 75 nm, the value of a jitter became at most 6.5%. On the other hand, as shown in FIG. 3, in a case of the metal reflection film of the Al alloy, if its film thickness was at least 15 nm and at most 40 nm, the value of a jitter became at most 6.5%. Herein, material of a metal reflection film is not limited especially to those in the examples. Another material may also be used, as long as it has a high reflectance ratio and can be uniformly formed on a substrate by a film formation apparatus. In addition, in order to enhance its corrosion resistance, a rare-earth metallic element such as Nd, or a transition metallic element such as Ti and Cr, may also be added a little to an Ag or Al reflection-film material.

Next, a reflectance ratio of a metal reflection film was examined. The thinner a metal reflection film becomes, the smaller a quantity of reflected light will be. Then, when the quantity of reflected light becomes smaller, in proportion to that, a medium noise also lowers. This keeps the S/N ratio unchanged. On the other hand, system noise or laser noise does not depend upon the quantity of reflected light. If the system noise or the laser noise is far lower than medium noise so that it can be neglected, then it will not affect quality of a reproduced signal, even though the quantity of reflected light becomes smaller.

However, if the quantity of reflected light becomes smaller, and the system noise or the laser noise reaches the same level as the medium noise, then the quality of a reproduced signal will deteriorate when the quantity of reflected light decreases. Besides, if the metal reflection film is made of a different material even though it has the same film thickness, that will change its reflectance ratio, and thereby, will change the film thickness at which signal quality worsens. In addition, if the metal reflection film becomes thicker, a reproduced signal will become worse. For example, in a magnetron sputtering apparatus, metallic atoms on a target which have been sputtered by Ar ions come flying onto a substrate, so that a metal reflection film is formed. A size of these metallic atoms also depends upon structure of a film formation apparatus, or conditions of film formation. But such a film tends to be difficult to form at a bottom of the shortest pit.

Figure 4:
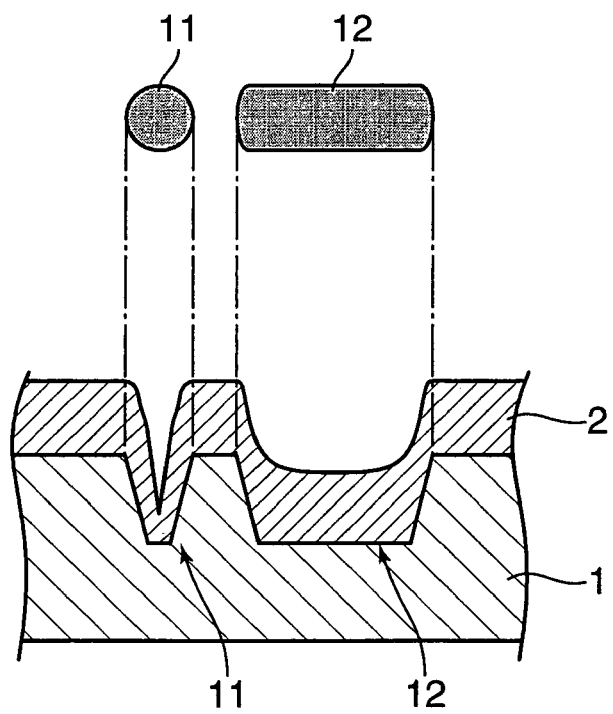
FIG. 4 is a sectional view of an optical disk in which a metal reflection film, which is made of an AgPdCu alloy and has a film thickness of 100 nm, is formed on a substrate where pits are formed.

FIG. 4 is a sectional view of an optical disk in which a metal reflection film, which is made of an AgPdCu alloy and has a film thickness of 100 nm, is formed on a substrate where pits are formed. As shown in FIG. 4, a shortest pit 11 and a long pit 12, which is longer than the shortest pit 11, are formed on a substrate 1. In this case, at a bottom of the shortest pit 11, a metal reflection film 2 is more difficult to form than at a bottom of the long pit 12. Therefore, the shortest pit 11 after the metal reflection film 2 has been formed becomes smaller, and at the same time, deeper than it was on the substrate 1.

If one anticipates this phenomenon, and thus, makes a recording power greater so that the shortest pit 11 can be greater, then signal quality of the shortest pit 11 will improve. However, when recording power becomes greater, the long pit 12 will be wider. This makes cross talk greater which comes from adjacent tracks, thus worsening the value of a jitter. In consideration of factors which can worsen the signal quality of both kinds of films, substrates were formed which were suitable for metal reflection films of an Al alloy and an AgPdCu alloy. As a result, a maximum film thickness of the Al-alloy metal reflection film at which the value of a jitter was prevented from worsening was 40 nm, and a maximum film thickness of the AgPdCu-alloy metal reflection film at which the value of a jitter was prevented from worsening was 70 nm.

Figure 5:
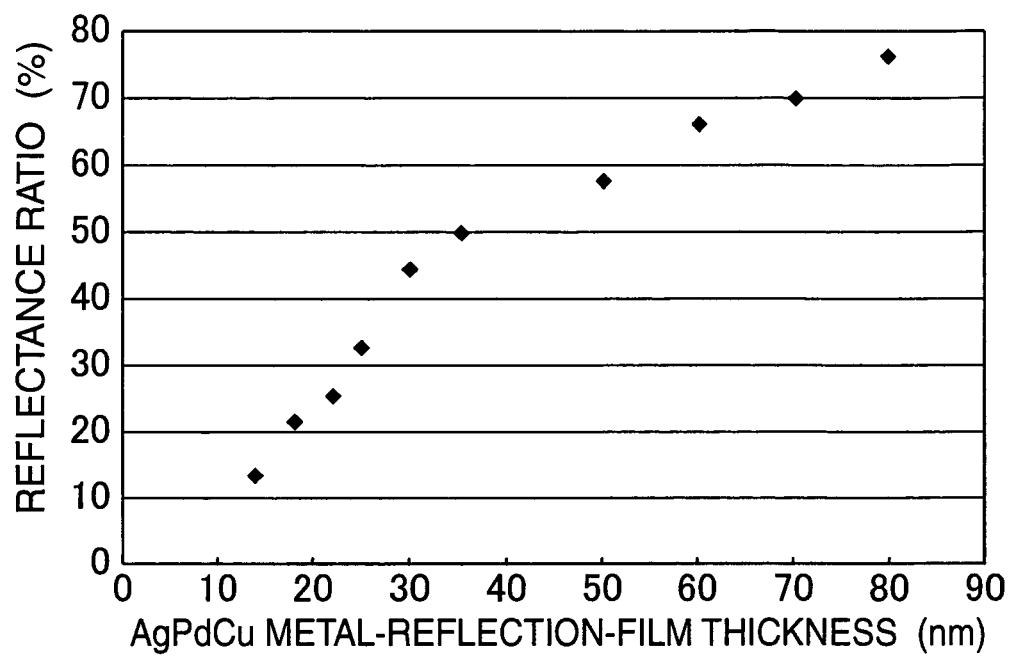
FIG. 5 is a graphical representation, showing a measurement result of a reflectance ratio which corresponds to film thickness of a metal reflection film which is made of an AgPdCu alloy.
Figure 6:
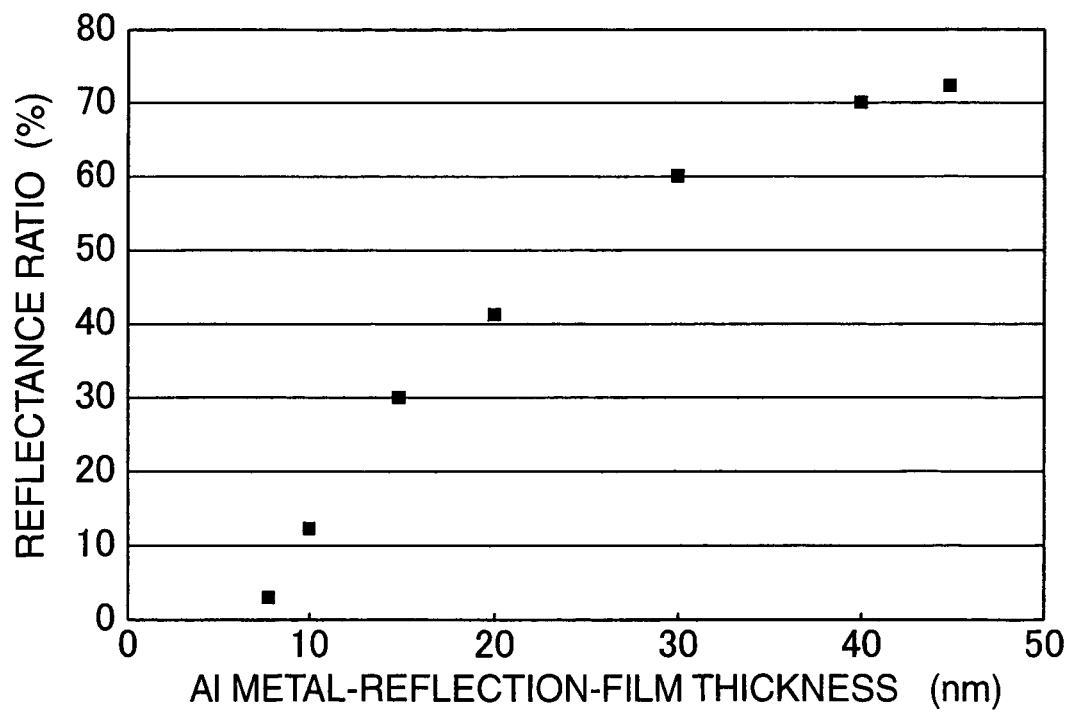
FIG. 6 is a graphical representation, showing a measurement result of a reflectance ratio which corresponds to film thickness of a metal reflection film which is made of an Al alloy.

Based on this study, a reflectance ratio was measured which corresponded to the film thickness of each of the AgPdCu-alloy metal reflection film which is shown in FIG. 2 and the Al-alloy metal reflection film which is shown in FIG. 3. FIG. 5 is a graphical representation, showing a measurement result of the reflectance ratio which corresponds to the film thickness of a metal reflection film which is made of an AgPdCu alloy. FIG. 6 is a graphical representation, showing a measurement result of the reflectance ratio which corresponds to the film thickness of a metal reflection film which is made of an Al alloy. In each of FIGS. 5 and 6, the horizontal axis is the film thickness (nm) of the metal reflection film, and the vertical axis is the reflectance ratio (%). Herein, the refractive index n of the resin layer which was used for measurement is 1.53, and the wavelength $\lambda$ of the beam of light is 405 nm.

As can be seen in FIG. 5, in the case of the AgPdCu-alloy metal reflection film, the reflectance ratio which corresponded to a film thickness of 25 nm to 70 nm at which a desirable jitter value was obtained was 35% to 70%. In the case of the Al-alloy metal reflection film in FIG. 6, the reflectance ratio which corresponded to a film thickness of 15 nm to 40 nm at which a desirable jitter value was obtained was 35% to 70%. As a result, for each film, the reflectance ratio of the metal reflection film at which the quality of a reproduced signal could be guaranteed was at least 35% and at most 70%.

Figure 7:
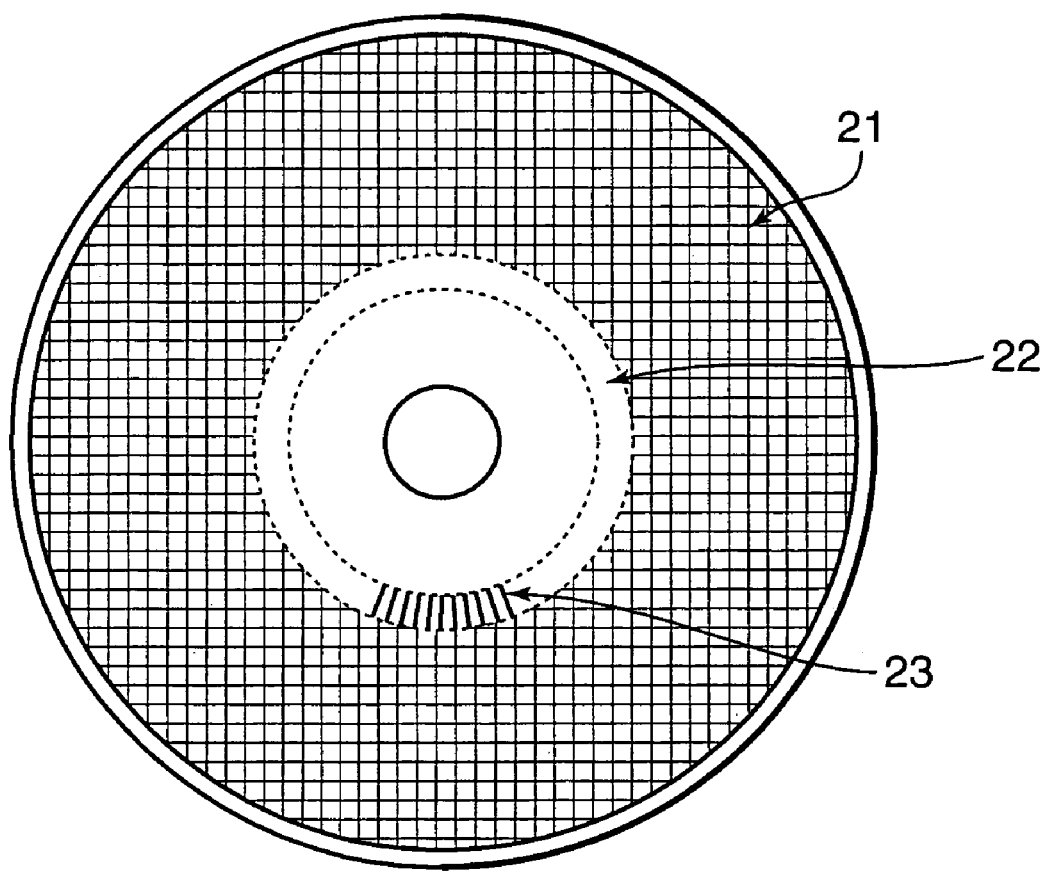
FIG. 7 is a top view of an optical disk, showing an example of its main-information area and sub-information area.

Next, in order to obtain a reproduction signal which has a desirable jitter value in such a way as described above, an uneven row of pits is formed as main data in a main-information area of an optical disk. A detailed description will be given of medium identification information which is formed in a sub-information area of the optical disk. FIG. 7 is a top view of an optical disk, showing an example of its main-information area and sub-information area.

In the example shown in FIG. 7, a main-information area 21 (which is a hatching part in this figure) is set in an outer circular part on the optical disk. In a ring-shaped part inside of the outer circular part, a BCA area 22 (which is an area between two circles shown by broken lines in the figure) is set which is a sub-information area. In the BCA area 22, medium identification information 23 is recorded in a bar-code pattern. A transparent resin layer of polycarbonate or the like is formed on a metal reflection film, and thereafter, the medium identification information 23 is recorded by irradiating, with a pulse laser (e.g., a YAG laser), the metal reflection film which lies at a depth of 0.1 mm from a surface of the optical disk. At this time, the metal reflection film seems to melt, and then, accumulate at both boundary parts by surface tension. In this way, the metal reflection film is partially removed, and thus, several reflection-film removed areas are formed. This creates a BCA area where medium identification information is recorded which is used to identify the optical disk individually.

Next, a method of recording the medium identification information in the BOA area of an optical disk will be described in detail. Herein, in the following example, a method by which a record is made in the BCA area is described, with respect to a metal reflection film which is made of an Ag98Pd1Cu1 (wt %), or a metal reflection film which is made of an Al99Cr1 (wt %), as the metal reflection film. However, as long as the same effect can be obtained, the present invention can also be applied to other kinds of metal reflection films, a phase-change film, or an optical magnetic recording film.

Figure 8:
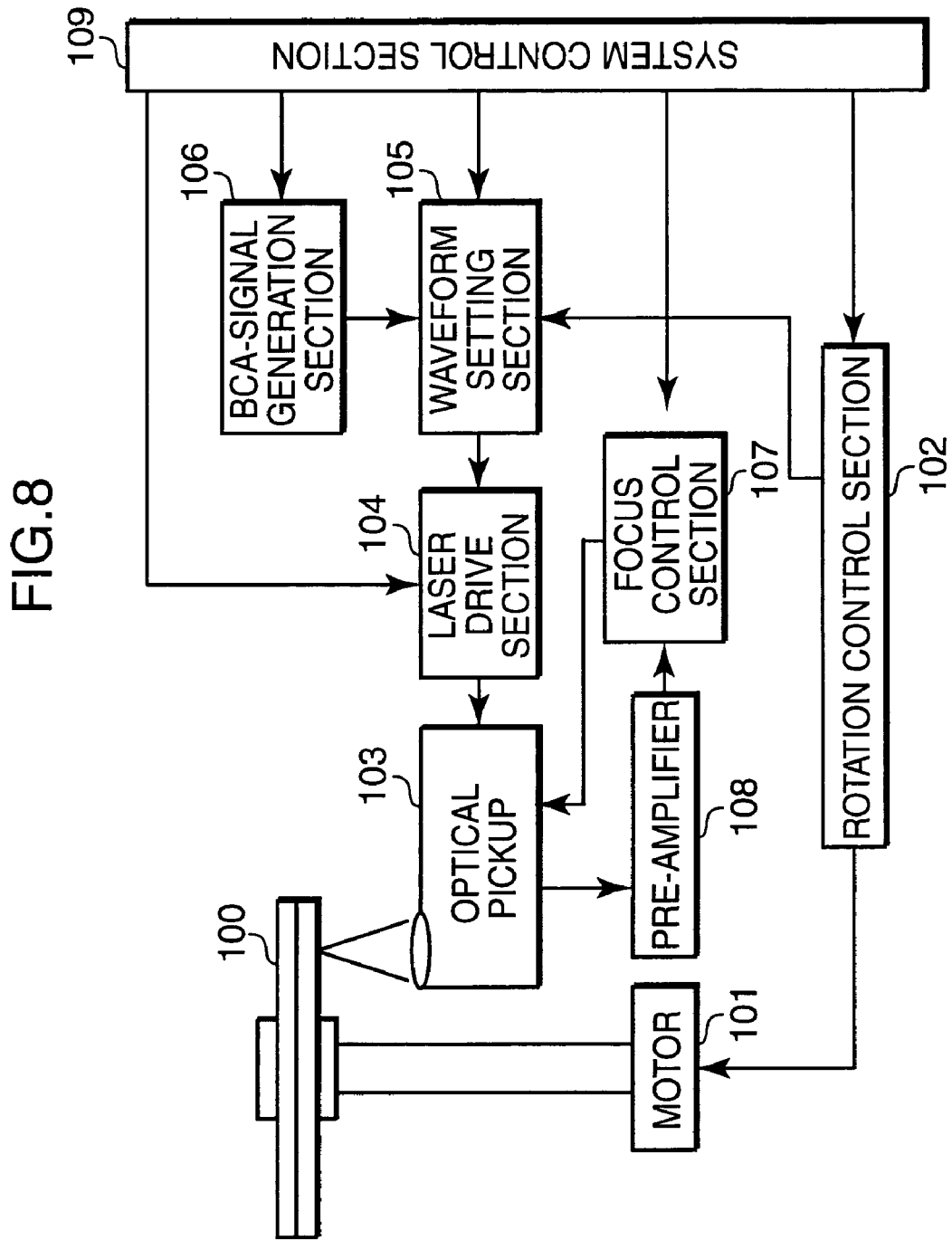
FIG. 8 is a block diagram, showing a configuration of a medium-identification-information recording apparatus which records medium identification information in a BCA area.

FIG. 8 is a block diagram, showing a configuration of a medium-identification-information recording apparatus which records medium identification information in a BCA area. The medium-identification-information recording apparatus shown in FIG. 8 is a BCA-pattern recording apparatus which is used to create a BCA area in a DVD-ROM. The apparatus includes: a motor 101; a rotation control section 102; an optical pickup 103; a laser drive section 104; a waveform setting section 105; a BCA-signal generation section 106; a focus control section 107; a pre-amplifier 108; and a system control section 109.

The rotation control section 102 controls rotation of the motor 101. The motor 101 rotates an optical disk 100 at a predetermined rotational speed. The BCA-signal generation section 106 creates a BCA signal by modulating medium identification information which is recorded in the optical disk 100. Based on the BCA signal, the waveform setting section 105 creates a laser modulation waveform. According to the laser modulation waveform, the laser drive section 104 drives a high-power laser inside of the optical pickup 103. The optical pickup 103 converges a beam of light emitted from the high-power laser, through its built-in optical system, upon the optical disk 100. The pre-amplifier 108 amplifies a reproduced signal which comes from the optical pickup 103, and then, outputs it to the focus control section 107. Using an amplified signal which comes from the pre-amplifier 108, the focus control section 107 controls an objective lens inside of the optical pickup 103, so that a beam of light can be converged on a metal reflection film of the optical disk 100. The system control section 109 systematically controls operation of the rotation control section 102, the laser drive section 104, the waveform setting section 105, the BCA-signal generation section 106, and the focus control section 107.

Next, a recording operation will be described of the medium-identification-information recording apparatus which is configured as described above. First, based on an instruction from the system control section 109, the rotation control section 102 drives the motor 101 to rotate the optical disk 100. The laser drive section 104 drives the high-power laser as a light source, and then, a beam of light which is emitted from the high-power laser is applied to the optical disk 100 from the optical pickup 103. At this time, the focus control section 107 executes focus control so that a beam of light which has been emitted from the high-power laser is converged on the metal reflection film of the optical disk 100.

Herein, reflected light from the optical disk 100 is detected by a photo-detector inside of the optical pickup 103. Then, a reproduced signal is outputted as an electric signal from the photo-detector. This reproduced signal is amplified through the pre-amplifier 108 and is inputted in the focus control section 107. In response to this amplified signal, the focus control section 107 drives the objective lens of the optical pickup 103 and moves it slightly in a focus direction on the optical disk 100. Thus, it controls the optical pickup 103 so that the beam of light can be converged on the metal reflection film of the optical disk 100.

Next, the system control section 109 allows a position detector (not shown) to detect a position of the optical pickup 103 in a tracking direction. Based on this detected positional information, the system control section 109 recognizes the optical pickup 103 to be located in a sub-information recording starting position. Next, the system control section 109 instructs the BCA-signal generation section 106 to generate a BCA signal. Then, the BCA signal is outputted from the waveform setting section 105, a BCA recording sequence starts, and the medium identification information is recorded in the BCA area.

In an optical disk where a 50 nm-thick metal reflection film made of an AgPdCu alloy was formed, using the above described medium-identification-information recording apparatus, an attempt to record a BCA pattern (or a bar-code pattern) was made in a part where neither a row of pits nor a guide groove was formed. However, even if output power of a laser was heightened, a reflection-film removed area in which the metal reflection film was removed could not be created.

This is because a melting point of Al is 660° C. while a melting point of Ag is 960° C. It takes a larger quantity of energy to melt the metal reflection film of an AgPdCu alloy. In addition, thermal conductivity of Al is 237 W/(m·K) while thermal conductivity of Ag is 427° C. Therefore, a larger quantity of heat is diffused by conduction of heat, even though the metal reflection film of an AgPdCu alloy is irradiated with a beam of light. Herein, in general, a melting point of metal is lowered by mixing a different metal. However, in order to secure an adequate reflectance ratio and avoid corrosion, a wt % of Ag in the metal reflection film cannot be reduced to at most 97%.

Next, in the optical disk where the 50 nm-thick metal reflection film made of an AgPdCu alloy was formed, a row of pits was formed at a track pitch of 0.24 µm which was used in a BCA area of a DVD-ROM, and a BCA pattern was recorded in that part. At this time, the BCA pattern could not be recorded at a predetermined width, and thus, information could not be reproduced. However, a part of this AgPdCu-alloy metal reflection film melts, and a small reflection-film removed part could be formed. This is because a metal reflection film tends to be difficult to form on an inclined surface of an uneven substrate, and thus, a film thickness of the metal reflection film in a pit inclined-surface part becomes thin locally and heat conduction is hindered.

Figure 9:
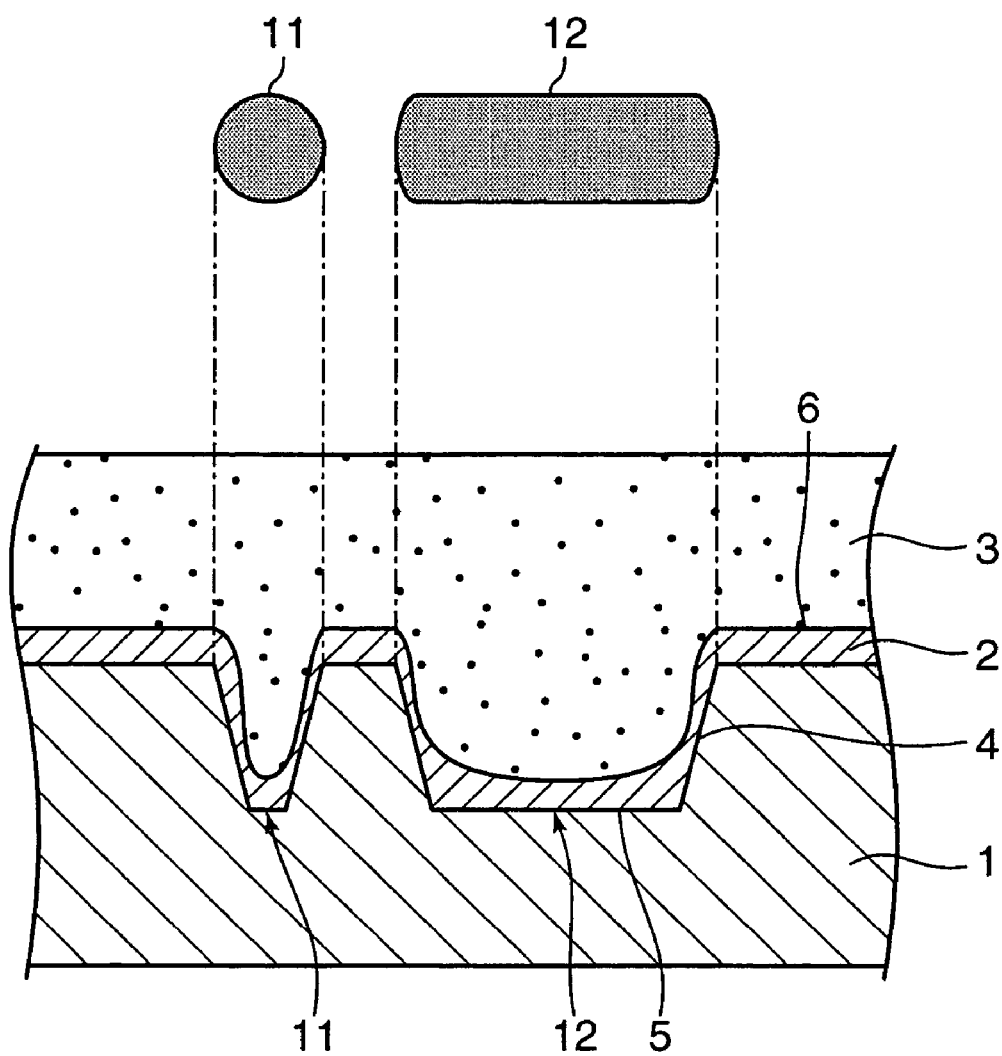
FIG. 9 is a sectional view of an optical disk in which a metal reflection film is formed on a substrate where pits are formed, and in addition, a resin layer is formed on the metal reflection film.

FIG. 9 is a sectional view of an optical disk in which a metal reflection film is formed on a substrate where pits are formed, and in addition, a resin layer is formed on the metal reflection film. As shown in FIG. 9, metal reflection film 2 is formed on substrate 1 where pit 12 is formed, and in addition, a resin layer 3 is formed on the metal reflection film 2. In this case, a film thickness of the metal reflection film 2 which is formed on an inclined-surface part 4 becomes thinner than the film thickness of the metal reflection film 2 which is formed on each of a pit-bottom part 5 and a flat-plate part 6. Thereby, a quantity of heat which is conducted around becomes smaller. Hence, the narrower the track pitch of a row of pits becomes and the larger an area of the inclined-surface part 4 becomes, the more easily heat will be conducted. Besides, in the inclined-surface part 4, a volume per unit of the metal reflection film 2 is smaller than any other part. Therefore, a heat capacity of the metal reflection film necessary for reaching the meting point becomes smaller, and thus, the meting point is reached with a lower irradiation power.

Figure 10:
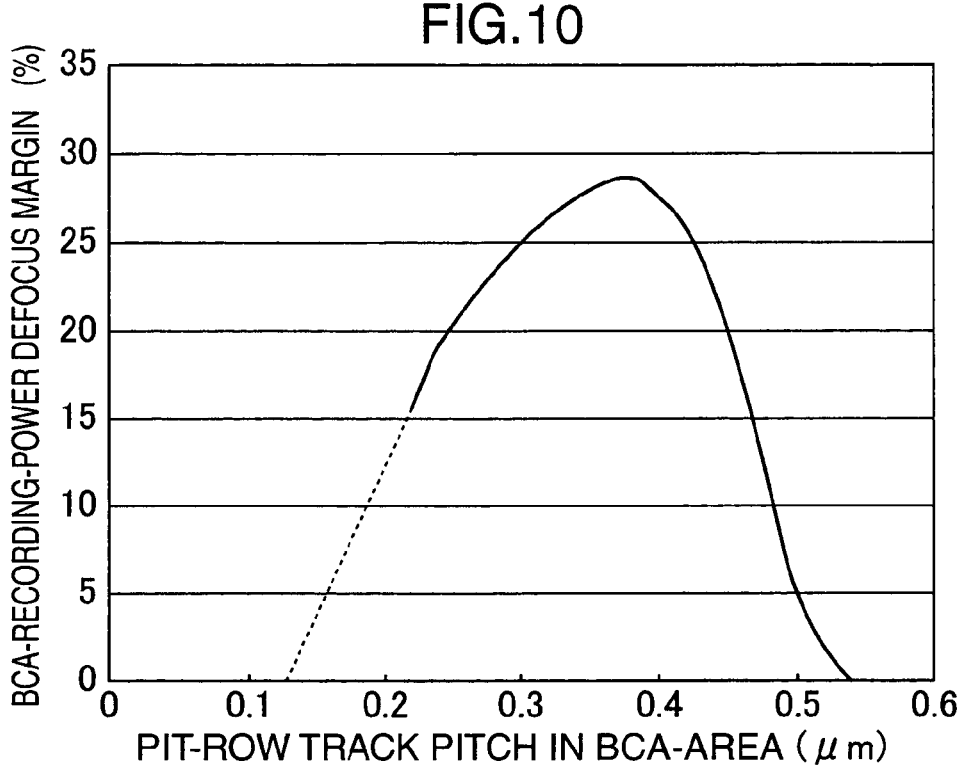
FIG. 10 is a graphical representation, showing a measurement result of a defocus margin of BCA recording power which corresponds to a track pitch of a row of pits which is formed in an optical disk that includes a 50 nm thick metal reflection film which is made of an AgPdCu alloy.

Based upon the above described knowledge, optical disks were prepared in which a 50 nm-thick metal reflection film made of an AgPdCu alloy was formed on each substrate where a row of pits was formed at various track pitches. Then, a BCA pattern was recorded in each optical disk. FIG. 10 is a graphical representation, showing a measurement result of a defocus margin of a BCA recording power which corresponds to a track pitch of a row of pits which is formed in an optical disk that includes a 50 nm metal reflection film which is made of an AgPdCu alloy. The horizontal axis in FIG. 10 is the track pitch (μm) of a row of pits and the vertical axis is the defocus margin (%).

As shown in FIG. 10, in an area where a row of pits was formed at a track pitch of at most 0.54 μm, a BCA pattern could be recorded, and medium identification information could be recorded. On the other hand, in an area where a row of pits was formed at a track pitch of at least 0.54 μm, no defocus margin could be secured. Herein, a judgment that a BCA pattern was recorded, was made by setting and reproducing created optical disks in an assessment machine. The judgment was made based upon whether or not medium identification information which was recorded in the BCA area could be accurately reproduced. As the assessment machine, a reproducing apparatus was used in which a beam of light for reproduction had a wavelength λ of 405 nm and an objective lens had a numerical aperture NA of 0.85.

Herein, if one takes mass production of optical disks into account, one has to consider a number of factors, such as dispersion of film thickness of a metal reflection film, and a variation in a BCA recording power. Therefore, a defocus margin of at least 20% is required as its adequate level. In FIG. 10, the track pitch at which a defocus margin of at least 20% is obtained is at least 0.24 μm wide and at most 0.45 μm wide. Hence, if the track pitch of a row of pits which is recorded in the BCA area is at least 0.24 μm wide and at most 0.45 μm wide, an adequate defocus margin can be secured, and medium identification information can be recorded. A presumable reason for this is described below.

Specifically, if the track pitch of a row of pits which is recorded in the BCA area is beyond 0.45 μm, a number of pits per unit area becomes smaller, and thus, an area of inclined-surface parts of pits also becomes smaller. This hinders heat conduction from being cut off adequately. Therefore, if a heat capacity which is absorbed by a metal reflection film varies according to defocus, a BCA pattern whose noise is low cannot be recorded.

On the other hand, if the track pitch is narrower than 0.24 μm, a pit is too close to its adjacent pits. Therefore, formation of a land part between pits becomes inadequate, and an angle of an inclined-surface part of a pit becomes narrower. Thereby, a metal reflection film becomes easier to form on inclined-surface parts of such pits, and thus, an effect of cutting off heat conduction by formation of pits is reduced. Herein, in FIG. 10, a BCA pattern could be recorded and reproduced up to a point where the track pitch was 0.22 μm, while a BCA pattern could not be recorded when the track pitch was narrower than 0.22 μm. Hence, in FIG. 10, a dotted line is an estimated line which corresponds to a track pitch of at most 0.22 μm.

In addition, FIG. 10 shows that in an optical disk where a 50 nm-thick metal reflection film made of an AgPdCu alloy was formed, a defocus margin is dependent upon the track pitch. However, in an optical disk where a desirable jitter value was obtained, a metal reflection film which was made of Ag or an Ag alloy might also have a film thickness of at least 25 nm and at most 70 nm. In that case, if the track pitch of a row of pits which was recorded in a BCA area was at least 0.24 μm wide and at most 0.45 μm wide, a defocus margin could be obtained at the same level as described above.

Similarly, instead of a row of pits, the same experiment as described above was also conducted in an optical disk where a guide groove was formed. Even in a case of a guide groove, a metal reflection film tended to be difficult to form at an inclined-surface part of the guide groove, as was the case with a row of pits. Thus, if the track pitch of a guide groove which was recorded in a BCA area was at least 0.24 μm wide and at most 0.45 μm wide, a defocus margin could be obtained at the same level as described above.

Therefore, in a case of an optical disk where a desirable jitter value was obtained, a metal reflection film which was made of Ag or an Ag alloy had a film thickness of at least 25 nm and at most 70 nm, and if the track pitch of a row of pits or a guide groove which was recorded in a BCA part was at least 0.24 μm wide and at most 0.45 μm wide, then a defocus margin could be adequately secured.

Next, an optical disk will be described whose metal reflection film was created by using a metal reflection film which was made of an Al99Cr1 (wt %) (hereinafter, referred to as an Al reflection film). First, an optical disk was prepared where the Al reflection film having a film thickness of 30 nm was formed. Using the above described medium-identification-information recording apparatus, an attempt to record a BCA pattern was made in a part where neither a row of pits nor a guide groove was formed. In this case, a part could be formed in which the Al reflection film was removed, and in addition, medium identification information which was recorded as the BCA pattern could also be reproduced. However, the Al reflection film was thinner than one (i.e., 50 to 70 nm) which was used in a DVD-ROM, and thus, an adequate defocus margin could not be obtained. In addition, in the optical disk where the Al reflection film with a film thickness of 30 nm was formed, if a BCA pattern was recorded in an area where a row of pits was formed at a 0.74 μm track pitch which was used in the BCA area of the DVD-ROM, then the same result as described above was obtained.

Figure 11:
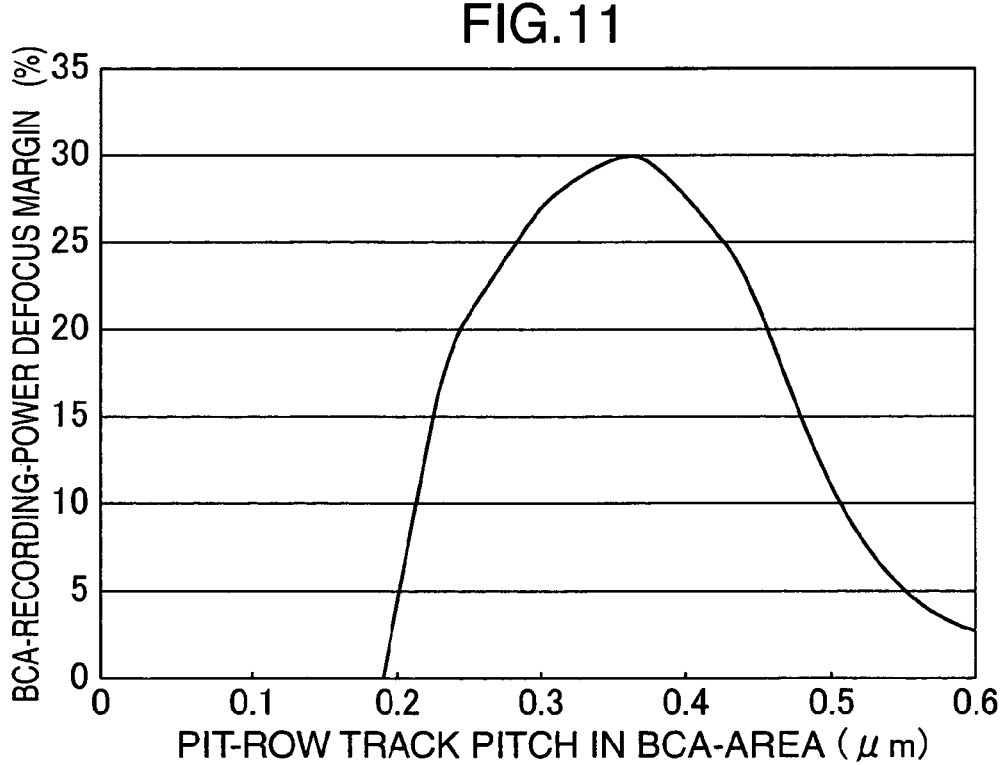
FIG. 11 is a graphical representation, showing a measurement result of a defocus margin of BCA recording power which corresponds to a track pitch of a row of pits which is formed in an optical disk that includes an Al reflection film whose film thickness is 30 nm.

Therefore, an optical disk was prepared where the Al reflection film with a film-thickness of 30 nm was formed on a substrate where a row of pits was formed at various track pitches. Then, a BCA pattern was recorded. FIG. 11 is a graphical representation, showing a measurement result of a defocus margin of a BCA recording power which corresponds to the track pitch of a row of pits which is formed in an optical disk that includes an Al reflection film which has a film thickness of 30 nm. The horizontal axis of FIG. 11 is the track pitch (μm) of a row of pits, and the vertical axis is the defocus margin (%).

Even in a case of the Al reflection film, in the same way as described above, a defocus margin of at least 20% is required at a time of BCA recording. In FIG. 11, a track pitch at which a defocus margin of at least 20% is obtained is at least 0.24 μm wide and at most 0.45 μm wide. Hence, even in the optical disk where the Al reflection film with a thinner film thickness than that of a DVD-ROM is formed, if the track pitch of pits which is recorded in the BCA area is at least 0.24 μm wide and at most 0.45 μm wide, an adequate defocus margin can be secured, and medium identification information can be recorded. A presumable reason for this is described below.

Specifically, if the track pitch of a row of pits which is recorded in the BCA area is beyond 0.45 μm, heat capacity necessary for reaching a melting point, becomes extremely small, because the Al reflection film is thin. Thereby, an edge part of a BCA pattern is not formed desirably, thus making louder noise of a BCA reproduction signal.

On the other hand, if a row of pits is formed at a track pitch of at most 0.45 µm, the narrower the track pitch becomes, the more likely a pit is formed at an edge of a BCA pattern. Thus, a melted Al reflection film is kept from flowing at a part where a pit is formed. Hence, in an area where pits are formed at a narrower track pitch, noise of a BCA pattern becomes lower. As a result, if a row of pits is formed at a track pitch of at most 0.45 µm, a BCA pattern which realizes an adequate defocus margin can be recorded.

However, if the track pitch becomes narrower than 0.24 µm, an angle of an inclined surface of a pit which is formed becomes narrower. This weakens a force which prevents the Al reflection film from flowing, and thus, an adequate defocus margin cannot be obtained.

Therefore, if a row of pits is formed on a substrate at a track pitch of at least 0.24 µm and at most 0.45 µm, control of heat is easily conducted even in an Al reflection film which has a thin film thickness. Consequently, the Al reflection film could be removed almost completely, and thus, a desirable BCA pattern could be recorded.

Herein, FIG. 11 shows that in an optical disk where a 30 nm-thick metal reflection film made of an Al99Cr1 (wt %) was formed, the defocus margin is dependent upon the track pitch. However, in an optical disk where a desirable jitter value was obtained, a metal reflection film which was made of Al or an Al alloy might also have a film thickness of at least 15 nm and at most 40 nm. In that case, if the track pitch of a row of pits which was recorded in a BCA area was at least 0.24 µm wide and at most 0.45 µm wide, a defocus margin could be obtained at the same level as described above.

Similarly, instead of a row of pits, the same experiment as described above was also conducted in an optical disk where a guide groove was formed. Even in a case of a guide groove, the same effect could be produced. Thus, if the track pitch of a guide groove which was recorded in a BCA area was at least 0.24 µm wide and at most 0.45 µm wide, a defocus margin could be obtained at the same level.

Next, a multi-layer optical disk will be described which is a multi-layer optical recording medium which is formed by laminating a plurality of metal reflection films as information recording layers. For example, on a first polycarbonate substrate having a thickness of 1.1 mm where a row of pits is formed, a first metal reflection film which is made of Al and has a film thickness of 45 nm is formed, using the above described magnetron sputtering apparatus. Onto this metal reflection film, a second polycarbonate substrate having a thickness of 15 µm where pits are formed is glued, so that its side where those pits are not formed comes into contact with the metal reflection film. As an adhesive, for example, a resin to be hardened by light or the like is used which is strong in terms of adhesive bonding. Then, on the second polycarbonate substrate which has been glued in such a way as described above, a metal reflection film is formed which is made of AgPdCu and has a film thickness of 28 nm. On top of this metal reflection film, a transparent resin layer is glued which has a thickness of 70 µm. As an adhesive, for example, a pressure-sensitive adhesive sheet or the like is used.

Even in a double-layer optical disk which was created in such a way as described above, if the track pitch of a row of pits which was recorded in a BCA area is at least 0.24 µm wide and at most 0.45 µm wide, a focus was adjusted at a time of a BCA recording, and thereby, a BCA pattern could be recorded in both layers. Hence, a defocus margin could be obtained at the same level as described above.

Herein, the method of creating a multi-layer optical disk is not limited especially to the above described example. Before a transparent resin layer is glued, a plurality of substrates may also be formed, so that a multi-layer optical disk can be obtained. In this case, even if an optical disk is layered, a focus is adjusted at a time of a BCA recording, and thereby, a BCA pattern can be recorded in a desired layer. In addition, when a transparent resin layer and a polycarbonate substrate are glued, a light-hardened resin and a pressure-sensitive adhesive sheet are used. But instead of these, an adhesive and transparent medium, such as a dry photo-polymer, may also be used. Or, without gluing a transparent resin layer, a transparent resin layer may also be formed by using only a pressure-sensitive adhesive sheet, or only a light-hardened resin.

As described above, in this multi-layer optical disk, several layers were glued, thereby heightening its recording density. In addition, the track pitch of a row of pits or a guide groove which was formed in the BCA area was set to at least 0.24 µm wide and at most 0.45 µm wide. Thereby, when a BCA pattern was recorded, a focus of a laser beam of light was adjusted to metal reflection films in which the row of pits or the guide groove was formed, so that a suitable laser power could be applied. Consequently, a BCA pattern could be recorded which had low noise and a desired width.

Herein, in a ROM optical disk, the shorter its recording time becomes, the lower its costs will be. Therefore, in each of the above described examples, it is desirable that a row of pits or a guide groove in the BCA area and a row of pits in the main-information area be formed simultaneously. In addition, if the track pitch of a row of pits or a guide groove in the BCA area is largely different from the track pitch of a row of pits in the main-information area, when a master disk is manufactured, a rotational speed of the disk has to be largely changed discontinuously. Or, the main-information area is adjacent to the BCA area, and thus, the rotational speed of the disk needs to be controlled so that it becomes a desired rotational speed as fast as possible. In order to make its linear velocity constant, preferably, the track pitch of a row of pits in the main-information area should be equal to the track pitch of a row of pits or a guide groove in the BCA area.

INDUSTRIAL APPLICABILITY

As described hereinbefore, according to the present invention, by using a beam of light for reproduction having a shorter wavelength and an optical system having a higher numerical aperture, data can be recorded at a higher density than in a DVD ROM optical disk. In addition, even though thermal conductivity or a melting point, which is an intrinsic value of a metal reflection film, is different, by using a conventional medium-identification-information recording apparatus, medium identification information can be recorded so that an adequate defocus margin can be secured. Hence, the present invention can be suitably applied to an optical recording medium, for example, an optical disk which has a circular-plate shape and is used to generate information, or the like.

The invention claimed is:

1. A method of manufacturing an optical recording medium,
wherein the optical recording medium includes:
a main-information area in which a reflection layer is formed on a substrate where a row of pits is formed as main data, and in which information is to be reproduced by irradiating the reflection layer with a beam of light having a wavelength of approximately 405 nm; and
a sub-information area in which medium identification information is to be recorded by irradiating the reflection layer with a high-power laser to form a plurality of barcode patterns extending in a radial direction, the medium identification information individually identifying the optical recording medium, wherein a row of pits is formed on the substrate in the sub-information area, wherein the sub-information area is concentrically located closer to a center of the optical recording medium than the main-information area, wherein the method of manufacturing the optical recording medium comprises:

a step of setting a range of a track pitch of the row of pits in the main-information area;

a step of setting a range of a track pitch of the row of pits in the sub-information area; and a step of forming a track in the sub-information area and the main-information area, wherein the track pitch in the main-information area is at least 0.24 μm wide and at most 0.43 μm wide, and the track pitch in the sub-information area is at least 0.24 μm wide and at most 0.45 μm wide, and wherein the track pitch of the row of pits in the sub-information area is different from the track pitch of the row of pits in the main-information area.

2. The method of manufacturing the optical recording medium according to claims 1, wherein the reflection layer contains a metal material.

3. An information reproducing method of reproducing the optical recording medium manufactured by the manufacturing method of claim 1, wherein the reflection layer is irradiated with a beam of light having a wavelength of 405 nm to reproduce information in the main-information area where the row of pits is formed, and the sub-information area in which the medium identification information is recorded.

* * * * *